United States Patent [19]

Lim et al.

[11] Patent Number: 4,824,252
[45] Date of Patent: Apr. 25, 1989

[54] LASER GYRO SYSTEM

[75] Inventors: Wah L. Lim, Anaheim, Calif.; Francis H. Zeman, New Brighton, Minn.

[73] Assignee: Honeywell Inc., Minneapolis, Minn.

[21] Appl. No.: 392,410

[22] Filed: Jun. 25, 1982

[51] Int. Cl.$^4$ ............................................. G01C 19/64
[52] U.S. Cl. ..................................... 356/350; 372/33; 372/107
[58] Field of Search ..................... 356/350; 372/33, 94, 372/107; 310/332

[56] References Cited

U.S. PATENT DOCUMENTS

| | | | |
|---|---|---|---|
| 4,099,876 | 7/1978 | Dorsman | 356/350 |
| 4,113,387 | 9/1978 | Shutt | 356/350 |
| 4,149,779 | 4/1979 | Hamerdinger et al. | 372/107 X |
| 4,152,071 | 5/1979 | Podgorski | 356/350 |
| 4,348,113 | 9/1982 | Bonfils | 356/350 |
| 4,383,763 | 5/1983 | Hutchings et al. | 356/350 |
| 4,422,762 | 12/1983 | Hutchings et al. | 356/350 |

Primary Examiner—Vincent P. McGraw
Attorney, Agent, or Firm—Robert A. Pajak

[57] ABSTRACT

Disclosed is an improved method and apparatus for providing lock-in error reduction in ring laser angular rate sensors. Two independent feed back control systems are employed to independently alter the laser path of a ring laser angular rate sensor so as to obtain a minimum lock-in rate.

15 Claims, 6 Drawing Sheets

LASER GYRO SYSTEM

Reference is hereby made to a copending application by Werner H. Egli, et al, entitled "Discriminant Apparatus For Laser Gyros" having serial number, 353,711. Reference is also hereby made to U.S. Pat. No. 3,373,650, by J. E. Killpatrick, entitled, "Laser Angular Rate Sensor", and U.S. Pat. No. 4,152,071, by Theodore J. Podgorski, entitled, "Control Apparatus" which also are assigned to the same assignee as the present application. Reference is also hereby made to U.S. Pat. No. 4,113,387, by Sidney G. Shutt, entitled, "Dual Mode Laser Optics Control For Ring Laser Gyro".

The present invention relates to improvements for ring laser gyro systems, particularly, improvements in lock-in rate reduction systems.

In a simple laser angular rate sensor, sometimes referred to as a ring laser gyro, two electromagnetic waves in the form of monochromatic beams of light are generated to propagate in opposite directions substantially along an optical closed-loop path which defines the input axis about which the rotation rate is sensed. The optical closed-loop path is made up of at least a plurality of straight line segments along which the beams of light propagate in opposite directions. The closed-loop path is substantially defined by a plurality of wave reflecting surfaces such as mirrors. Along the closed-loop path coupling of energy occurs between each of the waves due to such contributors, among others, as backscattering at the wave reflecting surfaces and losses through the medium. Coupling of energy between the waves results in the phenomena known as lock-in. Lock-in is the situation where the frequency of each of the waves locks in to a common frequency. "Lock-in rotation rate" is the rate of rotation of the sensor below which there is no discernible frequency difference to obtain a measurement of rotation.

Sensors of the class described may be provided with a frequency biasing means so that measurement of rotation rates below the lock-in rate may be obtained. Frequency biasing may be provided by a variety of techniques such as those taught in U.S. Pat. Nos. 3,373,650 and 3,467,472 where the frequency difference periodically alternates in sign. Frequency bias may also be provided by sufficient frequency separation of the frequencies of the counter-propagating waves. The frequency bias may be introduced by rotationally oscillating the sensor, back and forth, or by rotating the sensor at a constant high rate, oscillating a frequency separating means in the optical path of the waves, such as a Faraday Cell, or applying a constant frequency separation by a means in the optical path of the waves. These and other techniques are well known in the art.

U.S. Pat. No. 4,152,071 discloses a control apparatus for minimizing lock-in rate. A pair of mirrors defining the closed-loop path of the laser angular rate sensor are positionally moved in translation in a push-pull arrangement by a single feedback control system so as to alter the position of the closed-loop path or lasing path within a cavity so as to actively control the lock-in rate of the sensor at a minimum value. When the sensor's lock-in rate is a minimum, the accumulation of lock-in error in a dithered gyro, referred to as random drift, is kept at a minimum. Further, a minimum lock-in rate corresponds to optimum sensor.

In some prior art laser angular rate sensors, a mechanically and thermally stable block material, such as quartz, is utilized to provide an optical closed-loop path cavity structure in which the lasing gain medium is contained. In such systems, sensor bias stability may be provided by (i) alignment of the optical closed-loop path relative to the cavity, and (ii) maintenance of a substantially constant path length so as to obtain a constant beam intensity. Bias stability control is commonly accomplished by providing a control system for maximizing the intensity of the waves.

U.S. Pat. No. 4,113,387 shows a laser optics adjustment means for separately controlling optical path length and alignment of the gyro laser optics. Disclosed in U.S. Pat. No. 4,113,387 is a dual-mode split bimorph device mounting a mirror interposed in the optical path of the laser optics of the gyro. The mirror can be directed to move in translation for path length control and rotation for alignment control. The dual-mode device and sensor system described in U.S. Pat. No. 4,113,387 provides a system for maintaining bias stability, but does not provide direct improvement for random drift which is directly related to the lock-in rate of the sensor system. This is so since the control system of U.S. Pat. No. 4,113,387 is responsive to only the average intensity of one of the waves. Any lock-in rate change in such a system would be merely coincidental.

SUMMARY OF THE INVENTION

The present invention provides an improved system and method for operating a laser angular rate sensor so as to substantially reduce the lock-in rate value of the laser angular rate sensor, and at the same time improve random drift gyro output error. One system of the present invention consists of a single tiltable mirror which provides a wave reflecting surface defining, at least in part, the optical closed-loop path of the sensor system. Lock-in rate control may be provided by directing the angle of tilt of the single tiltable mirror in response to a lock-in rate discriminant signal indicative of the sensor lock-in rate derived from the behavior of one or both of the sensor's counter-propagating waves.

In another system of the present invention, a lock-in rate discriminant signal is utilized in two feedback control systems to provide two degrees of freedom of control of the optical closed-loop path so as to alter the coupling of energy between each of the waves into the other to a condition at which the lock-in rate of the sensor is substantially a minimum. Several feedback control systems are disclosed utilizing a plurality of reference signals in combination with a plurality of lasing path control signals for altering the coupling of energy between the waves. The lock-in rate discriminant signal chosen, in turn, contains signal components related to the reference signals for synchronous detection and closed-loop control.

The present invention includes a tri-mode transducing apparatus capable of two degrees of freedom of tilt and one degree of translation. The tri-mode transducing apparatus having such capabilities is incorporated in a laser angular rate sensor for providing a mechanism for adjusting lasing path alignment, lasing path length, and lock-in control while simplifying sensor construction.

DESCRIPTION OF THE INVENTION

The lock-in phenomena is well known relative to laser angular rate sensors of the class wherein the frequency difference between counter-propagating waves, traveling along a closed-loop path, is indicative of rotation of the closed-loop path. The lock-in phenomena results in a "lock-in rate" below which said waves lock in to substantially the same frequency and therefore no discernible frequency difference exists. The lock-in phenomena arises from the coupling of energy between each of the waves into the other resulting in the frequencies of each of the waves to lock-in to substantially the same frequency. The dominant source of the coupling of energy between the waves has been well accepted to be backscattering at the wave reflecting surfaces defining the closed-loop path of the traveling waves. However, other sources of coupling of energy include, among others, forward scattering, birefringence aperture effect, the lasing gain medium, etc.

U.S. Pat. No. 4,152,071 taught a basic approach to minimizing lock-in rate. The basic approach is to first obtain a discriminant signal indicative of the lock-in rate and secondly to alter the lasing path in response to the lock-in rate discriminant signal to a condition at which the discriminant signal indicates a minimum lock-in rate.

In U.S. Pat. No. 4,152,071, a single reference signal in combination with a single control signal direct a transducer for altering the position of one of the wave reflecting surfaces defining the closed-loop path or lasing path. The reference signal was utilized to dither the position of the lasing path. The dithering of the lasing path was detected by a synchronous demodulator which demodulated a lock-in rate discriminant signal having a component at the reference frequency since it corresponds to the intensity variations of the intensity of one of the waves. The output of the demodulator then provides a single feedback control signal to actively control the average position of the controlled wave reflecting surface to arrive at a position about which dithering takes place so as to yield a minimum lock-in rate.

U.S. Pat. No. 4,152,071 taught that the sensor lock-in rate could be altered, and more importantly controlled, by translating at least one of the mirrors defining the lasing path. It was further taught that by altering the lasing path, through translation of one or two of the mirrors, the value of the sensor lock-in rate was periodic in nature having repetitive finite minimums and maximums. In the present application, it is presumed that their repetitive finite maximums and minimums result from the lasing path system boundary or initial system conditions as will be further described, and that these initial conditions can be altered.

In the above referred to application having Ser. No. 353,711, a unique and novel discriminant apparatus was disclosed for providing a discriminant signal indicative of the lock-in rate or random drift which may be used in conjunction with the system set forth in U.S. Pat. No. 4,152,071 and the invention herein. In the referred to application, the discriminant signal is derived from the intensity variations of the intensity of each of the counter-propagating waves in the sensor as a means for obtaining a signal indicative of the lock-in rate of the system. There are, of course, other possible lock-in rate discriminant signals and the scope of the present invention should not be limited to any particular discriminant.

For each laser angular rate sensor having a fixed optical path, there exists a condition of energy coupling between the waves or beams. The condition of coupling of energy results mainly from backscattering at the mirror surfaces. Coupling of energy between the waves occurring in the sensor system can be represented by a "phasor sum" which is the vectorial sum of all the scattered waves in the sensor system. The phasor sum for a fixed lasing path can be considered representative of the "initial condition" of the sensor system in which all of the initial scattered waves have an initial phase and an initial magnitude.

As taught in U.S. Pat. No. 4,152,071, a signal indicative of the intensity variations of one of the waves is utilized as a discriminant signal representative of the lock-in rate and corresponding phasor sum. This discriminant signal is utilized in a lasing path control system for adjusting the optical path of the laser beams to yield a minimum lock-in rate based on the chosen discriminant signal.

The optical or lasing path control system of U.S. Pat. No. 4,152,071 consists of a single feedback control system for dithering and controlling the average position of one of the mirrors defining the optical path of the laser angular rate sensor so as to obtain a minimum lock-in rate. Dithering and controlling the average position of the mirror dithers and controls the average optical path causing the phasor sum, and accordingly the lock-in rate discriminant signal, to dither about an average value. Thus the discriminant signal and mirror form part of a feedback control system.

The system just described and taught in U.S. Pat. No. 4,152,071 amounts to changing the "initial conditions" of a fixed sensor system by changing the phase relationship of the scattered waves through altering the optical path by use of a single feedback control system which controls one of the mirrors. Consequently, the phasor sum and corresponding lock-in rate discriminant signal is altered in phase and magnitude. However, the single feedback control system as aforesaid is unable to reduce the finite periodic minimums, indicated above, which is dependent upon the initial parameters of the sensor system which determine the phase and magnitude of the scattered waves. Thus, the control system as aforesaid may be referred to as a phasor sum tuning system for minimizing sensor lock-in rate.

In the present invention, an initial condition tuning mechanism is utilized to alter the initial phase and initial magnitude of the initial scattered waves by a single feedback control system, and can be used in place of the translational changes of the mirrors shown and described in U.S. Pat. No. 4,152,071. In one embodiment of the invention a mechanism provides tilting of one of the mirrors defining the lasing path so as to alter the initial conditions of the phasor sum. The tilting mirror mechanism is shown in an embodiment of the invention to be part of a single feedback control system for minimizing sensor lock-in rate by way of one degree of freedom of control of one mirror tilting.

In another embodiment of the invention, two independent feedback control systems are employed to independently alter the lasing path of a ring laser angular rate sensor so as to obtain a minimum lock-in rate. One or more mirrors defining the lasing path may be dithered and positioned by the two independent feedback control systems to provide two degrees of freedom of control of the lasing path. Each of the feedback control systems may be responsive to the same lock-in rate discriminant signal indicative of the lock-in rate.

The terms "initial condition tuning" and "phasor sum tuning" used above refer to two degrees of freedom of control of the lasing path and are useful to simplify the explanation of the invention which follows. However, in some embodiments of the invention the mechanism for initial condition tuning and phasor sum tuning are identical in form. In other embodiments, initial condition tuning is unique and refers to altering the limits which can be achieved by phasor sum tuning.

Figure 1A:
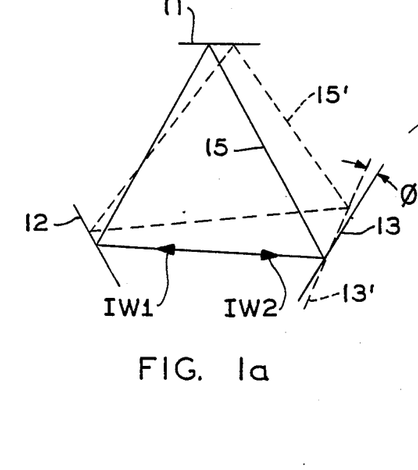
FIGS. 1a and 1b are diagrammatic representations of a lasing path of a laser angular rate sensor which has been altered by tilting of one of the wave reflecting means.
Figure 1B:
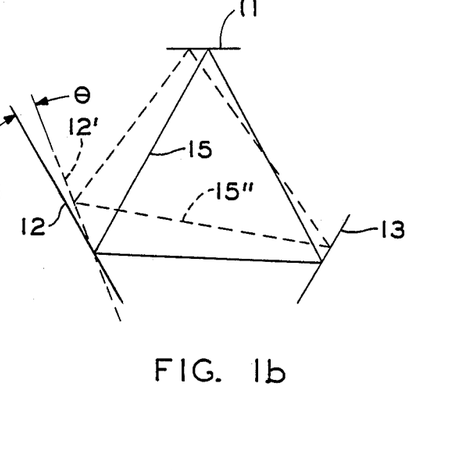

FIGS. 1a and 1b illustrate that the lasing path traveled by the counter-propagating waves IW1 and IW2 in a laser angular rate sensor can be altered by tilting any one of the wave reflecting surfaces. In FIG. 1a, an optical closed-loop path 15, shown in solid line, is defined by the positions of wave reflecting surfaces or mirrors 11, 12, and 13. In FIG. 1a mirror 13 is tilted by an angle $\phi$ to a new position indicated by numeral 13' which in turn establishes a new optical lasing path 15' which is indicated on the drawing by dashed lines. Tilting mirror 13 through the angle $\phi$, back and forth, continuously varies the optical lasing path between those triangular paths indicated by numerals 15 and 15'. Further, tilting mirror 13, back and forth, varies the angle of incidence of waves IW1 and IW2 upon each of the wave reflecting surfaces 11, 12, and 13 through a locus of points between the points of incidence of the waves impinging upon the wave reflecting surfaces corresponding to path 15 and path 15'. There exists then an average path position, not shown, located between paths 15 and 15'. This average path can be considered to be an initial condition path having an initial condition of coupling of energy between the waves. The initial condition path is dependent on, at least in part, the position of mirrors 11 and 12. A phasor sum and corresponding discriminant signal representative of the coupling of energy corresponding to the locus of paths between 15 and 15' will vary in magnitude and phase as mirror 13 tilts back and forth about an average mirror position. It is possible through a feedback control system to control the average position of wave reflecting surface 13 so as to control the average position of the optical closed-loop path which yields a coupling of energy between the waves where the lock-in rate is a minimum. The foregoing discussion is a basic principle of this invention and invention of U.S. Pat. No. 4,152,071.

In FIG. 1b, an optical closed-loop path 15, shown in solid line, is again defined by the positions of wave reflecting surfaces 11, 12, and 13. In FIG. 1b, mirror 12 is rotated by an angle $\theta$ to a new position indicated by numeral 12' which in turn establishes a new optical lasing path 15" which is indicated on the drawing by dashed lines. Tilting mirror 12 through the angle $\theta$, back and forth, continuously varies the optical lasing path between those triangular paths indicated by numerals 15 and 15". Further, tilting mirror 12, back and forth, varies the angle of incidence of waves IW1 and IW2 upon each of the mirrors 11, 12, and 13 through a locus of points between the points of incidence of the waves impinging thereon corresponding to path 15 and path 15". There also exists then an average path position, not shown, located between paths 15 and 15" different than the average path of FIG. 1a. A phasor sum and corresponding discriminant signal representative of the coupling of energy corresponding to paths 15 and 15" will vary in magnitude and phase as mirror 12 tilts back and forth about an average mirror position. It is possible through a feedback control system to vary the average position of wave reflecting surface 12 so as to vary the average position of the optical closed-loop path which yields a coupling of energy between the waves where the lock-in rate is a minimum.

The tilt angle of mirror 13 in FIG. 1a and the tilt angle of mirror 12 in FIG. 1b are both capable of altering the lasing path. However, associated with the average position of mirror 13 is a phasor sum and corresponding discriminant signal dependent on the average position of mirror 12, and associated with the average position of mirror 12 is a phasor sum and corresponding discriminant signal dependent on the average position of mirror 13. Thus there exists an optimum phasor sum obtainable by tilt angle adjustment of mirror 13 for each position of mirror 12 and vice versa. Thus a feedback control system can be provided for initial condition tuning one or the other of mirrors 12 and 13, and another independent feedback control system can be provided for phasor sum tuning the remaining mirror so as to alter the coupling of energy between the waves to result in a minimum sensor lock-in rate.

Figure 2:
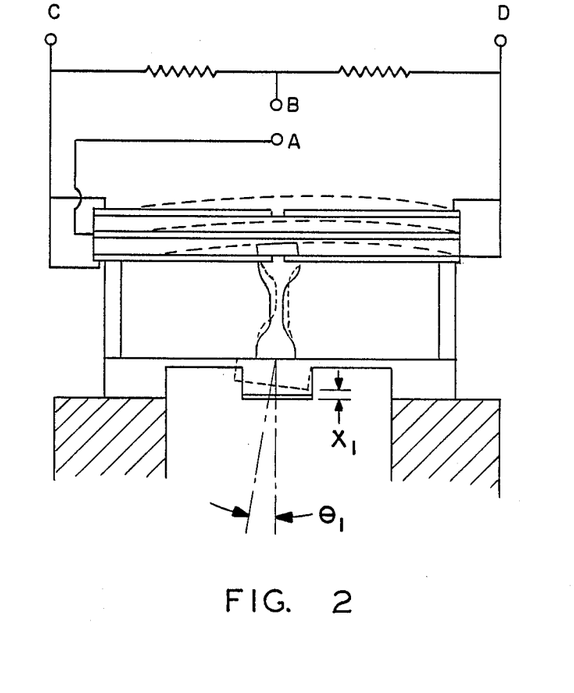
FIG. 2 is a schematic arrangement of a dual-mode bimorph device for rotating and translating a wave reflecting surface.

One means for tilting a wave reflecting surface or mirror like those shown in FIGS. 1a and 1b is disclosed in U.S. Pat. No. 4,113,387 and is shown in FIG. 2. FIG. 2 is substantially the same FIG. 2 of U.S. Pat. No. 4,113,387. It shows one type of a dual-mode transducer means capable of translating and tilting a mirror coupled thereto. As will be shown, the rotation movement or tilting movement shown in FIG. 2, can be utilized as a means for tilting one of the wave reflecting surfaces or mirrors 12 or 13 in FIGS. 1a and 1b. Further, the ability to translate the position of a wave reflecting surface can also be utilized for a path length control in combination with lock-in rate control. Note that the tilting capability depicted in FIG. 2 was used for alignment control in U.S. Pat. No. 4,113,387 and was controlled so as to affect the intensity of the waves. In the present application, tilting is used for lasing path alteration to offset the coupling of energy between waves to directly affect the lock-in rate and random drift of the sensor system as will be further detailed.

Optical lasing paths 15' and 15" shown in FIGS. 1a and 1b are grossly different lasing path configurations. In particular, the slopes of the path straight line segments of triangular paths 15' and 15" relative to the path straight line segments of triangular path 15 vary significantly. Also, the angles of incidence of the waves impinging on each of the wave reflecting surfaces 11, 12, and 13 is dramatically affected by the varying tilt of different wave reflecting surfaces. Thus, independent control of the tilting of mirrors 12 and 13 produce a wide range in variations of the optical closed-loop path, and more importantly produce a wide range in variations of the phase and magnitude of the scattered waves which varies the amount of coupling of energy between waves and correspondingly a wide range in variations of lock-in rates. Accordingly, independent control of a second wave reflecting surface can be considered to cause a variation in initial conditions about which phasor sum tuning can be applied to yield a minimum lock-in rate for a specific optical system. From FIGS. 1a and 1b, it can be seen that a variation of tilt of one or the other of the wave reflecting surfaces can be considered to be initial condition tuning and the other can be considered to be phasor sum tuning.

As indicated earlier, phasor sum tuning is altering the magnitude and phase of a phasor sum so s to result in a minimum lock-in rate. Initial condition tuning is altering the phasor sum in magnitude and phase to minimize the value of the lock-in rate obtained by phasor sum tuning. Therefore, the invention of the present application utilizes the principle of initial condition tuning and phasor sum tuning to optimize the value of the coupling of energy between the waves so as to produce the minimum lock-in rate and minimum random drift.

It should be recognized by those skilled in the art of laser angular rate sensors, that FIGURES 1a and 1b represent a gross exaggeration of the amount of tilting of the wave reflecting surfaces 12 and/or 13. Typically, the values of $\phi$ and $\theta$ are in terms of arc-seconds. Slight variations in tilt will produce sufficient variations in the angle of incidence of the waves impinging upon wave reflecting surfaces 11, 12, and 13 as well as sufficient variations in the trajectory of the lasing path between pairs of wave reflecting surfaces. These small variations in tilt of the wave reflecting surface produce the required alteration of the lasing path which in turn alters the coupling of energy between the waves allowing a feedback control system to optimize the average positions of the wave reflecting surface to produce a minimum lock-in rate.

Figure 3A:
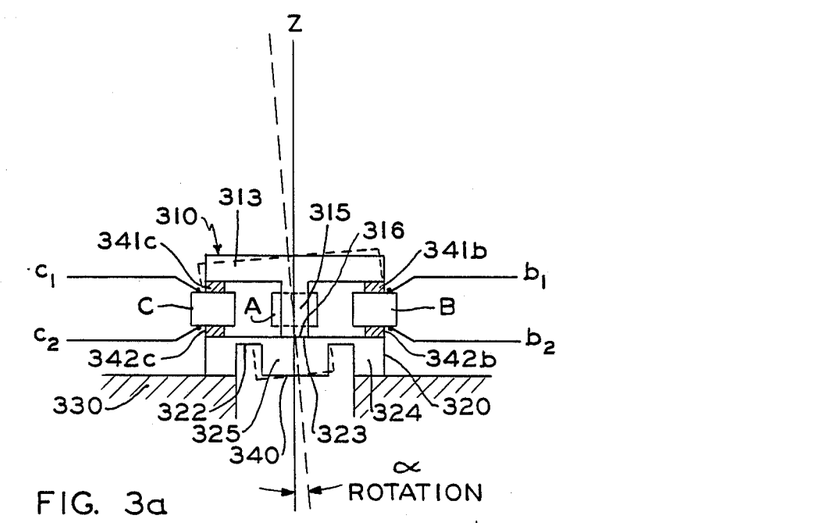
FIGS. 3a and 3b are a side view and top view respectively of a schematic of a dual-mode device for two degrees of freedom of tilt of a wave reflecting surface, and one degree of freedom of translation.
Figure 3B:
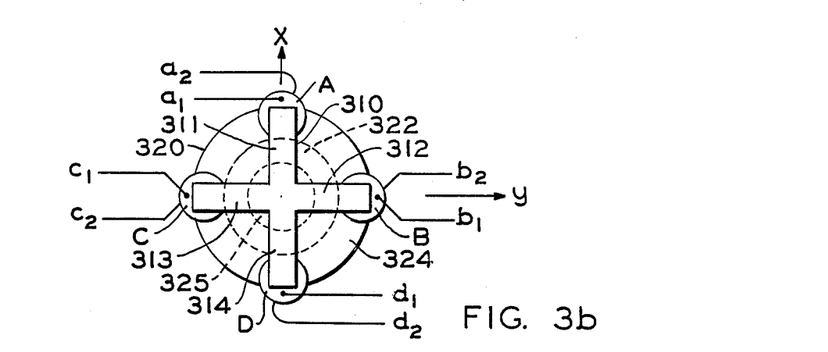
Figure 3C:
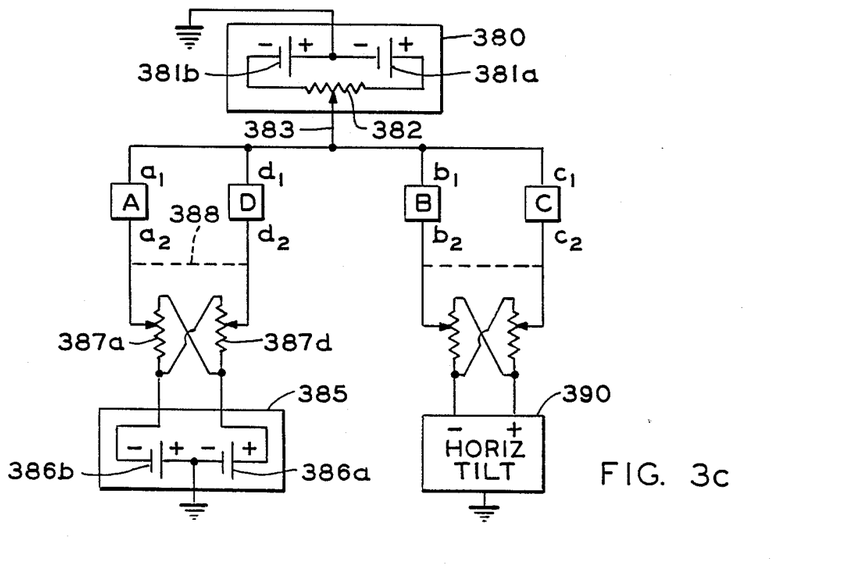
FIG. 3c is a schematic circuit diagram showing the electrical connections for controlling the apparatus of FIGS. 3a and 3b.

An important aspect of the present invention which provides simplicity in laser gyro design is shown in FIGS. 3a, b, and c. FIG. 3a is a side view of a tri-mode transducing means having a wave reflecting surface for reflecting laser beams in a ring laser optical system. FIG. 3b is a top view of FIG. 3a. FIG. 3c shows an electrical circuit for operating the tri-mode transducing means of FIGS. 3a and 3b by three independent control power sources. The tri-mode transducing means shown in FIGS. 3a, b, and c provides, in response to a first control signal, translation of a wave reflecting surface like that provided by the tilting means shown in FIG. 2, but also provides the capability of tilting a wave reflecting surface with two degrees of freedom in response to second and third control signals. The apparatus shown in FIG. 3 can be utilized in a ring laser control system for simultaneous control of (i) path length control, (ii) alignment control, and (iii) lock-in rate control—phasor sum or initial condition tuning.

Referring now to FIGS. 3a, b, and c a thermally and mechanically stable block 310 is shown having radial sections 311, 312, 313, and 314. Block 310 includes a central projection portion 315 having an end surface 316. The end surface of central projection portion 316 is rigidly coupled to a central portion 323 of a second thermally and mechanically stable block 320 Block 320 includes a cylindrical projection portion 324 capable of being rigidly mounted to a base structure 330. Further, block 320 is provided with a resilient thin inner cross section 322 for supporting a central projection portion 325 having a wave reflective end surface 340 capable of reflecting electromagnetic waves including laser beams. Blocks 310 and 320 may be provided by block materials such as quartz, a material known as CerVit, and the like. The reflective end surface may be provided by polishing said materials. On the other hand, the reflective end surface may be an attached mirror.

Interposed between radial portion 311 and block 320 is a first transducer A sandwiched between mechanical transferring means 341a and 342a (neither of which is shown); interposed between radial portion 312 and block 320 is a second transducer B sandwiched between mechanical transferring means 341b and 342b; interposed between radial portion 313 and block 320 is a third transducer C sandwiched between mechanical transferring means 341c and 342c; and interposed between radial portion 314 and block 320 is a fourth transducer D sandwiched between mechanical transferring means 341d and 342d (neither of which is shown).

Each of the transducers A, B, C, and D is a mechanical transducing means responsive to a control signal for altering its mechanical dimensions in some manner. The mechanical operation of FIGS. 3a and 3b is such that expansion or contraction of any one of the mechanical transducers, A, B, C, or D, causes movement of block 310 relative to base structure 330. In turn, movement of block 310 is transferred to central projection portion 325 and wave reflective end surface 340 through deforming the resilient cross section 322 by way of the rigid connection 316 between block 320 and central projection portion 315. Thus, wave reflective end surface position can vary dependent on the mechanical transduction of transducers A, B, C, and/or D.

By way of example each transducer may be a disc shaped piezoelectric device capable of expanding and contracting in an axial direction. In FIG. 3a the transducers are symmetrically placed at the ends of symmetrically positioned radial portions 311, 312, 313, and 314 which are separated by 90°. The piezoelectric devices are such that the expansion direction is along an axis parallel to the Z axis which passes through the central projection portion 315 of block 310, the central projection portion 324 and reflective end surface 340 of block 320. Each of the transducers has an upper terminating region designated respectively as $a_1$, $b_1$, $c_1$, and $d_1$, and a lower terminating region designated respectively $a_2$, $b_2$, $c_2$, and $d_2$. The structure of each of the piezoelectric devices is such that an application of the same potential to upper terminating region "1" relative to lower terminating region "2" will cause each of the transducers to expand or contract in the same direction. Each mechanical transferring means allows the expansion or contraction of the piezoelectric device to be transferred directly between block 310 and block 320 and at the same time between block 310 and base structure 330. The mechanical transferring means may be eliminated if the piezoelectric device is integrated with block 310 and/or block 320.

The specific magnitude and polarity of voltages applied to transducers A, B, C, and D will alter the position of the wave reflecting surface 340 by selectively translating along an axis through the reflective surface 340, primarily along the Z axis, and/or tilting about an axis parallel to the X axis, and/or tilting about an axis parallel to the Y axis. Considering the plane of the paper shown in FIG. 3a, the wave reflecting surface 340 is capable of tilting vertically, in and out of the paper (about Y axis) or tilting horizontally in the plane of the paper (about X axis).

Shown in FIG. 3c is one schematic diagram showing three independent power sources for controlling transducers A, B, C, and D for providing translation, vertical tilting and horizontal tilting. Translation may be provided by applying a common potential from source 380 between each of the upper and lower terminating regions 1 and 2. Vertical tilting may be provided by applying a potential from source 385 between the upper and lower terminating regions of diametrically opposite transducers A and D but with opposite polarity. Horizontal tilting may be provided by applying a potential from source 390 between the upper and lower terminating regions of diametrically opposite transducers B and C but with opposite polarity. This is so since one transducer will expand and the other will contract causing the tilting action. Translation along an axis through the reflective surface occurs since all transducers expand or contract in unison.

Shown in FIG. 3c is one example of implementing a control circuit for the dual-tilt plus translation transducer to provide the intended motion. Source 380 is shown having two direct current power sources 381a and 381b in series, having their common point connected to circuit ground. The remaining source terminals are connected across a potentiometer 382 having wiper arm 383 which is electrically connected in common to the upper terminating regions $a_1$, $b_1$, $c_1$, and $d_1$ of transducers A, B, C, and D respectively. In a somewhat similar fashion, power source 385 includes direct current power sources 386a and 386b in series, having their common point connected to circuit ground. Connected across the remaining terminals of the direct current power sources 386a and b are first and second potentiometers 387a and 387d. The wiper arm of 387a is connected to the lower terminating region $a_2$, and the wiper arm of potentiometer 387d is connected to the lower terminating region $d_2$. The wiper arms of potentiometers 387a and 387d are ganged together as indicated by dashed line 388. Further, the wiper arms are positioned and ganged together so that movement of the wiper arm changes the relative voltage of wiper arms in opposite sense, for example, one becoming more positive and the other becoming more negative. Similarly, source 390 can be constructed in a similar fashion as source 385. With sources 385 and 390 so constructed, variation in applied potentials across the appropriate transducers is such to produce the intended tilting action as already described.

Figure 4:
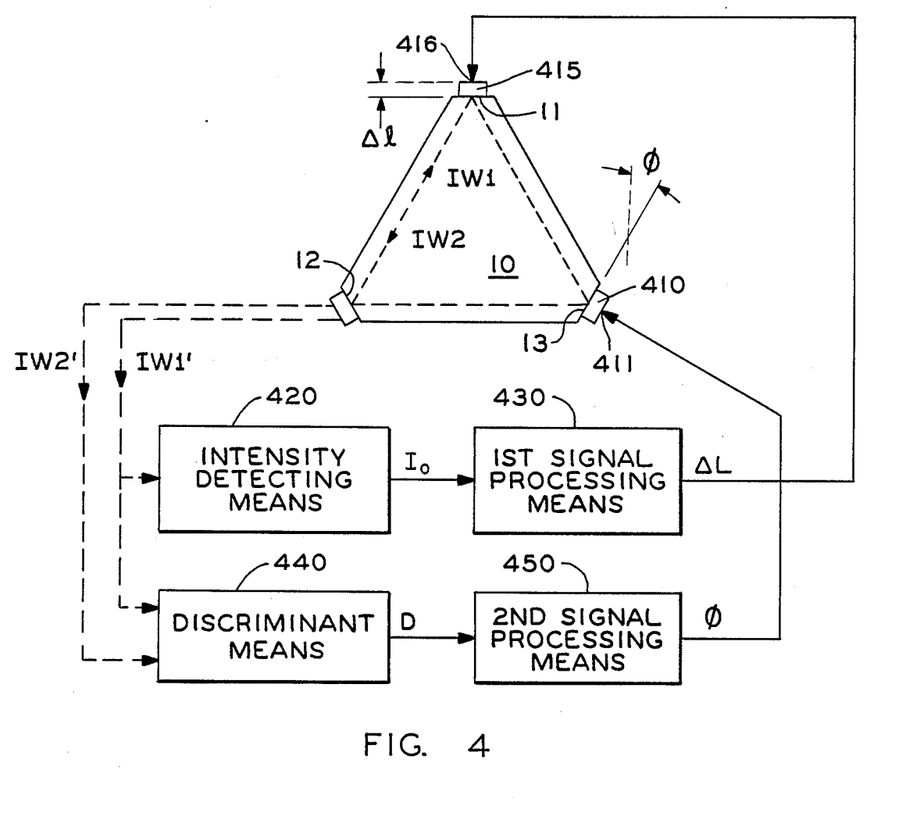
FIG. 4 is a block diagram of a laser angular rate sensor illustrating one of the principles of the invention.

FIG. 4 shows one embodiment of the present invention which is an improvement of the control apparatus disclosed in U.S. Pat. No. 4,152,071. Shown in FIG. 4 is a laser gyro 10 of triangular configuration well known in the art. The closed-loop path is defined by reflective surfaces 11, 12, and 13. Reflective surface 12 provides transmissivity of portion of the counter-propagating waves IW1 and IW2 for subsequent intensity detection and transduction into electrical signals. Reflective surface 11 is coupled to a first transducer 415, having a transducer input 416, for providing positional translation ($\Delta l$) of surface 11 perpendicular to the surface thereof in response to a control signal, $\Delta L$, presented to transducer control input 416. Reflective surface 13 is coupled to transducer 410, having a transducer input 411, capable of tilting surface 13 substantially about an axis perpendicular to the paper through an angle $\phi$ in response to a control signal presented to transducer control input 411. As will be described, FIG. 4 provides an apparatus for phasor sum tuning and path length control similar to that of U.S. Pat. No. 4,152,071, but which phasor sum tuning is obtained by tilting only one of the wave reflecting surfaces. Note that the intended functions of transducers 410 and 415 may be accomplished by a single transducer capable of translation and tilt such as the one shown in either of FIGS. 2 or 3 as will be described, but are kept separate for explanatory purposes.

In FIG. 4, a portion of waves IW1 and IW2 are transmitted through wave reflecting means 12 as indicated by IW1' and IW2' respectively. An intensity detecting means 420 responds to wave IW1' and provides an output signal indicative of the average intensity thereof and is presented to first signal processing means 430. The output of first signal processing means 430, indicated by $\Delta L$, is electrically connected to control input 416 of transducer 415 for control of the translational position of reflective surface 11. Discriminant means 440 is shown responsive to waves IW1' and IW2', and having an output signal indicative of the lock-in rate of laser gyro 10. Discriminant means 440 is shown responsive to the "intensity variations" caused by the coupling of energy between the waves as noted in U.S. Pat. No. 4,152,071 and so is a useful signal related to the lock-in rate. It should be noted that discriminant means 440 may be responsive to the intensity variations of the intensity of one or both of the waves to provide an output signal related to the energy coupling between the waves and accordingly the lock-in rate.

The output of discriminant means 440 is presented to second signal processing means 450 having an output signal, indicated by $\phi$. The output of second signal processing means 450 is presented to control input 411 of transducer 410 for positioning, by tilting, wave reflecting surface 13. Note that tilting of wave reflecting surface 13 alters the optical closed-loop path or lasing path which in turn results in a change in the coupling of energy between the waves causing a change in the lock-in rate of the sensor. Tilting mirror 13 as indicated is not the same as alignment to maximize and/or stabilize beam intensity, but rather is effective in varying the magnitude of the intensity variations due to the coupling of energy.

In operation, intensity detecting means 420 responds to the intensity of either of the waves IW1' or IW2'. In FIG. 4, a first control loop is provided by intensity detecting means 420, first signal processing means 430, and transducer 415. The intensity detecting means responds to wave IW1', a portion of wave IW1. First signal processing means 430 operates on the output of the intensity detecting means 420 to position the wave reflecting means 11 to obtain and maintain maximum intensity. This feedback control system is well known in the art and is usually referred to as a path length control system. The main purpose of the path length control system is to maintain a constant intensity so that the laser gyro system provides an output signal which has good bias stability.

At the same time, a second control loop is provided by discriminant means 440, second signal processing means 450, and transducer 410. The second control loop is utilized to provide lock-in rate control/minimization in a manner similar to the control system shown in U.S. Pat. No. 4,152,071. In U.S. Pat. No. 4,152,071, a pair of transducers are operated in push-pull fashion which translates the position of a mirror coupled to each transducer to obtain a minimum lock-in rate in response to the chosen lock-in rate discriminant signal. However, in the embodiment of the present invention shown in FIG. 4, only a single transducer 410 capable of tilting one of the reflecting surfaces is all that is required to provide phasor sum tuning and obtain a minimum lock-in rate. One degree of freedom of tilt of reflective surface 13 will alter the lasing path or closed-loop path. Discriminant means 440 can be similar to that disclosed in U.S. Pat. No. 4,152,071, or can be that disclosed in the aforementioned copending application. Discriminant means 440 is shown being responsive to each of the counterpropagating waves for providing a signal indicative of the lock-in rate.

Intensity detecting means 420 is well known in the art. It usually includes at least one photodetector for providing an output signal indicative of the intensity of one of the waves. The photodetector output is usually AC amplified and passed through a low pass filter to provide an output signal indicative of the average intensity of one of the waves.

Discriminant means 440 usually includes at least one photodetector as shown in U.S. Pat. No. 4,152,071. The photodetector output must be processed by discriminant means 440 to obtain a signal D related to the intensity variations of at least one of the waves or a combination of both of the waves. These intensity variations are related to the coupling of energy between the waves as aforesaid, and is useful in determining a signal related to the lock-in rate. In some embodiments of discriminant means 440, the photodetector signal is rectified and peak detected to determine the intensity variations so as to produce the discriminant signal D.

Figure 7:
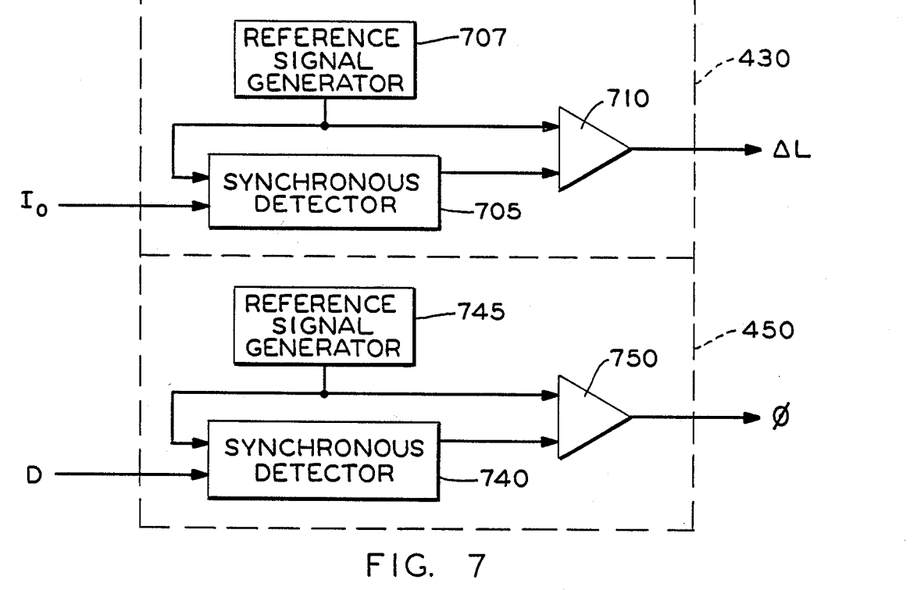
FIG. 7 is a block diagram showing an implementation of the signal processing means shown in FIG. 4.

One example of first signal processing means 430 and one example of second signal processing means 450 are illustrated in FIG. 7. The output of intensity detecting means 420, $I_o$, is presented as one input to a synchronous detector 705. An output of a reference signal generator 707 is presented to a second input of synchronous detector 705 and to one input of a difference amplifier 710. The output of synchronous detector 705 is presented as a second input to difference amplifier 710. The output of difference amplifier 710, designated $\Delta L$, provides the signal to control input 416 of transducer 415.

In normal operation of the above described arrangement of signal processing means 430, the output of reference signal generator 707 is applied to control input 416 of transducer 415 through differential amplifier 706 for modulating or dithering the position of wave reflecting surface 11 coupled to transducer 415. Doing so modulates the path length of the optical closed-loop path which in turn will vary the intensity of both waves IW1 and IW2 and corresponding waves IW1' and IW2'. The output of intensity detecting means 420 is a signal representative then of the intensity of a selected one of the waves—for example IW1'—and contains a signal component related to reference signal generator 707. Synchronous detector 705 responsive to the output of reference signal generator 707 detects the reference signal generator 707 component of the wave intensity for providing an output signal indicative of the average intensity of the output wave selected. The output of synchronous detector 705 is essentially a DC signal related to the intensity of wave IW1'. The combination of synchronous detector 705, reference signal generator 707, and differential amplifier 706 serves as an elementary negative feedback closed-loop control for maximizing the intensity of the waves, but more importantly maintains the waves at a constant intensity which is presumed to be the maximum intensity for maintaining bias stability.

In a practical implementation of signal processing means 430, reference signal generator 707 may be a square wave generator for minutely varying the path length between two positions at a first frequency. A synchronous detector may be a simple synchronous demodulator in combination with a simple integrator. Of course, the entire signal processor 430 could be digitally implemented instead of the analog implementation shown and described.

Again referring to FIG. 7, signal processing means 450 is constructed in a similar manner as signal processing means 430. The output of discriminant means 440, indicated by the symbol D, is presented as one input to synchronous detector 740. The output of a reference signal generator 745 is presented to one input of synchronous detector 740 and to one input of differential amplifier 750. The output of synchronous detector 740 is presented as a second input to differential amplifier 750. The output of differential amplifier 750, indicated by the symbol $\phi$, is presented to control input 411 of transducer 410 for tilting wave reflecting means 13 in a manner as aforesaid with reference to FIG. 1. Like signal processing means 430, signal processing means 450 serves as an elementary negative feedback closed-loop control. However, signal processing means 450 has the function of adjusting the tilt of wave reflecting means 13 so as to obtain a lasing path or optical closed-loop path of the laser beams which produces a minimum lock-in rate.

In normal operation of the above described arrangement of signal processing means 450, the output of reference signal generator 745 is applied to the control input 411 of transducer 410 through differential amplifier 750 for modulating or dithering the tilt position of wave reflecting surface 13 coupled to transducer 410. Doing so modulates the lasing path resulting in a variation of the coupling of energy between the waves. The intensity variation of the waves which corresponds to the coupling of energy between the waves will very in response to the dithering of mirror 13. Accordingly the output of discriminant means 440 will contain a signal component related to the reference signal generator 745. Synchronous detector 740 responsive to the output of reference signal generator 745 detects the reference signal generator 745 component of the intensity variations caused by the coupling of energy between waves. The output of synchronous detector 740 is essentially a DC signal related to the intensity variations of waves IW1 and IW2 indicated by the discriminant signal D. The combination of synchronous detector 740, reference signal generator 745, and differential amplifier 750 serves as an elementary negative feedback closed-loop control for minimizing the lock-in rate of the sensor system. The dithering produced by reference signal generator 745 varies the position of wave reflecting means 13 about an average position which yields the minimum lock-in rate of the sensor system.

In a practical implementation of signal processing means 450, reference signal generator 745 may be a square wave generator for minutely varying the angle $\phi$ (less than an arc-second) for minutely varying the lasing path. The frequency of the output of reference signal generator should be different from that of reference signal generator 707 so that cross-coupling between signals can be minimized.

As indicated earlier, the discriminant signal D is distinctively different from that of the intensity signal $I_o$. Signal $I_o$ is a measure of the average intensity of the beams, whereas the signal D is a measure of the amplitude of the intensity variations of one of the waves or a selected combination of the intensity variations of both of the waves.

Transducer 410 in FIG. 4 may be provided by either the tilting means shown in FIG. 2 or FIG. 3. Tilting of the wave reflecting surface of FIG. 2 may be accomplished by electrically applying a voltage related to the output of signal processing means 450 to terminals CD. Tilting of the wave reflecting surface 340 of FIG. 3 may be accomplished by altering voltage supply 386a or 386b, by a value related to signal processing means 450. In either case, the orientation of the tilt must be capable of altering the lasing path to affect the lock-in rate. Of course, the tilt direction of either tilting means must be appropriately oriented to provide the intended function.

The apparatus shown in FIG. 4 can be further modified by combining the operations of transducers 410 and 415 in a single transducer similar to that shown in FIG. 2 or FIG. 3 for elimination of one of the transducers 410 or 415. The single transducer, as shown in FIG. 2, is capable of translation and tilt. By proper orientation of the tilting means shown in FIG. 2, transducer 410 (for example) can be replaced by the dual-mode transducer shown in FIG. 2 having one control input AB connected to the output of first signal processing means 430 for translation of the wave reflecting means coupled thereto, and having the other control input CD connected to the output of second signal processing means 450 for tilting the wave reflecting means. If the transducer shown in FIG. 3 is used, the output of signal processor 430 may be adapted to provide source 380 for providing translation, and the output of signal processor 450 may be adapted to provide source 385 or 390, depending on orientation for providing the desired tilt. Accordingly, transducer 415 and wave reflecting means 11 may be replaced by a simple non-active wave reflecting means assembly.

Figure 5:
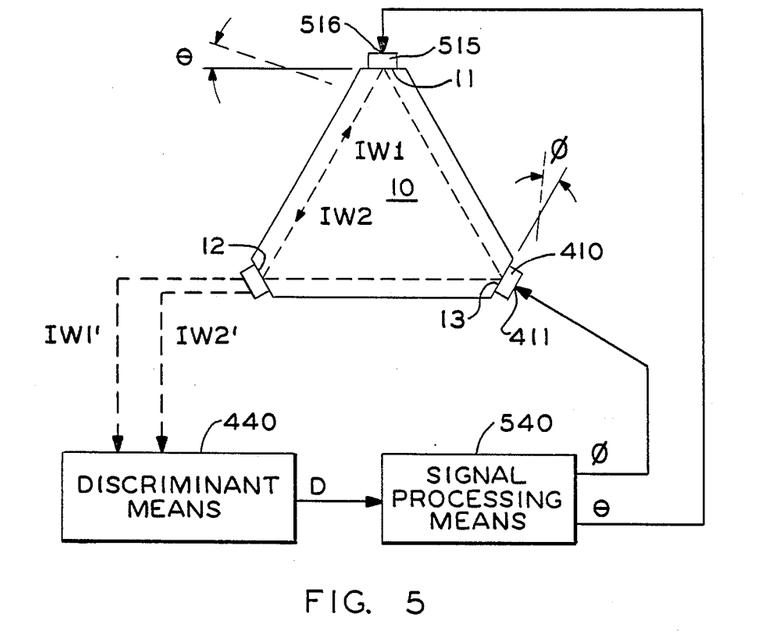
FIG. 5 is a block diagram of a laser angular rate sensor illustrating one of the principles of the invention.

Another embodiment of the invention is shown in FIG. 5 where two independent feedback control systems are operative to independently alter the lasing path to minimize the lock-in rate of the sensor system. Each of the feedback control systems is responsive to a discriminant signal indicative of the lock-in rate of the sensor. Each feedback control system provides an output signal for separately altering the lasing path to achieve minimum lock-in rate. The two lock-in rate feedback control systems practice the principle of initial condition tuning and phasor sum tuning discussed above. To simplify the explanation of FIG. 5, a path length control system is not shown therein, but such a system may be added as will be discussed in more detail.

In FIG. 5, again laser gyro 10 is shown having wave reflecting means 11, 12, and 13. FIG. 5 is similar to FIG. 4 and similar functioning blocks have retained the same numeral designation. However, in FIG. 5, transducer 415 is replaced by transducer 515 in which wave reflecting means 11 is coupled thereto. Transducer 515 is essentially the same as transducer 410 of FIG. 4 and provides a means for tilting the position of wave reflecting means 11 in response to a control signal presented to control input 516 of transducer 515. The direction of tilt is again a rotation about an axis perpendicular to plane of the paper.

Wave reflecting means 12 again provides output waves IW1' and IW2' which are presented to discriminant means 440. The output of discriminant means 440 is presented to signal processing means 540 capable of providing first and second signals for controlling transducers 410 and 515 independently. Signal processing means 540 provides, at least in part, two independent feedback control systems.

Figure 10:
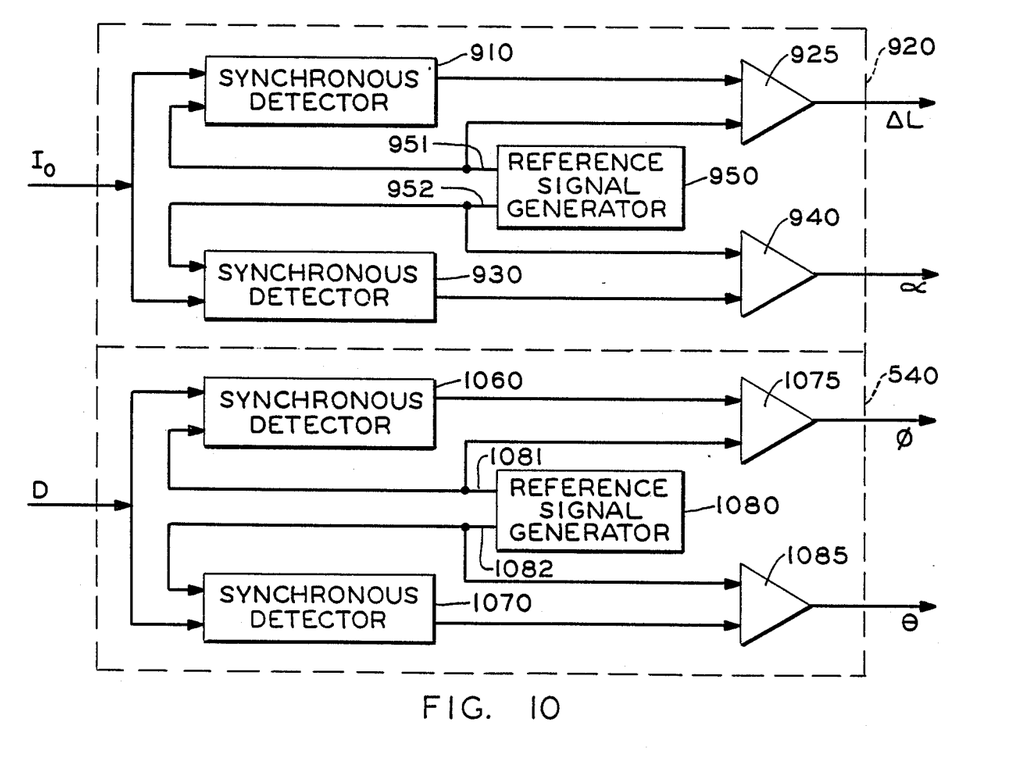
FIG. 10 is a block diagram of a signal processor utilized in the systems of some of the embodiments of the invention.

One example of signal processing means 540 is shown in FIG. 10. A first synchronous detector 1060 is responsive to the output of the discriminant means 440 and a first output of reference signal generator 1080 indicated by reference signal 1081. Reference signal 1081 is presented as one input to differential amplifier 1075 which has as a second input the output of synchronous detector 1060. The output of differential amplifier 1075 provides the output signal indicated by symbol $\phi$ which is presented to the input 411 of transducer 410. A second synchronous detector 1070 is responsive to the output of discriminant means 440 and a second output of reference signal generator 1080 indicated by reference signal 1082. Reference signal 1082 is presented as one input to a differential amplifier 1085 which has as a second input, the output of synchronous detector 1070. The output of differential amplifier 1085 provides the output signal indicated by the symbol $\theta$ which is presented to input 516 of transducer 515.

Note that first and second reference signals 1081 and 1082 need only have one distinguishable characteristic different from one another, for example different frequencies. In these circumstances, synchronous detectors 1060 and 1070 can be simple frequency demodulators. On the other hand, the first and second signals could be timed pulses or phase related requiring a corresponding means for synchronous detection as is well known in the art of control systems. In the following description, each reference signal may be considered to have a particular frequency characteristic to simplify the explanation and understanding.

Referring to FIGS. 5 and 10, reference signal generator 1080 provides first and second reference signals 1081 and 1082. First reference signal 1081, through differential amplifier 1075, dithers, by tilting, the position of wave reflecting means 13, and consequently dithers the lasing path in response to reference signal 1081. Accordingly, the discriminant means output signal, D, contains a signal component related to reference signal 1081. Similarly, reference signal 1082, through differential amplifier 1082, dithers, by tilting, the position of wave reflecting means 11, and consequently dithers the lasing path in response to reference signal 1082. Accordingly, the discriminant output signal, D, contains a signal component related to reference signal 1082. The output signal of synchronous detector 1060 controls the average position of wave reflecting surface 13, and synchronous detector 1070 controls, independently of synchronous detector 1060, the average position of wave reflecting surface 11.

The operation of the system shown in FIGS. 5 and 10 will now be described. The output of differential amplifier 1075 provides phasor sum tuning of the lasing path by adjustment of the lasing path through adjustment of wave reflecting means 13 to obtain a minimum lock-in condition dependent upon the average position of wave reflecting means 11 which corresponds to an initial condition of the coupling of energy between the waves. Dithering of the lasing path brought about by reference signal 1081 through amplifier 1075 alters the coupling of energy between the waves, and is observable by the signal component related to reference signal 1081 contained in the discriminant means output signal. The discriminant D is synchronously detected by detector 1060 for obtaining a DC control signal for directing transducer 410 to obtain an optimum average position of wave reflecting means 13 in a manner as already described with reference to FIG. 4 and signal processing means 450. However, concurrently the output of differential amplifier 1085 provides initial condition dithering of the lasing path in response to a different reference signal, namely reference signal 1082. The initial condition dithering is observable by the signal component related to reference signal 1082 also contained in the discriminant means output signal. The discriminant D is synchronously detected by detector 1070 for obtaining a DC control signal for directing transducer 515 to obtain an average position of wave reflecting means 11 which minimizes the lock-in rate in combination with phasor sum tuning through adjustment of transducer 410.

Thus, the system shown in FIG. 5 provides "initial condition" tuning and "phasor sum" tuning for obtaining minimum lock-in rate for a laser angular rate sensor. The coupling of energy between the two waves is altered by first and second transducers which direct the angle of incidence of the waves impinging upon their respective wave reflecting surfaces so as to independently alter the lasing path, and subsequently the coupling of energy between the waves which substantially determines the lock-in rate. Discriminant means 440, which responds to the intensity variations of the waves due to the coupling of energy, varies in response to the first and second dithering of the wave reflecting surfaces 11 and 13, and provides an output signal which contains signal components related to the first and second independent dithering of the transducers 415 and 410 respectively. These signal components of the discriminant D are separately detected for presentation to two independent negative feedback control systems for adjustment of the first and second transducers to yield minimum lock-in rate. Note that it is unimportant which control loop is termed "phasor sum" tuning or "initial conditioning" tuning. This is so since both servo loops provide alteration of the lasing path to affect the coupling of energy between the counter-propagating waves.

As already indicated, a path length control loop is usually provided with a laser angular rate sensor so as to provide bias stability. The path length control loop shown in FIG. 4 including intensity detecting means 420 and first signal processing means 430 may be incorporated into the system shown in FIG. 5 and will be described in further detail with reference to FIG. 8.

Phase tuning and initial condition tuning just described may be applied to the gyro system disclosed in U.S. Pat. No. 4,152,071. Shown in FIG. 6 is another embodiment of the invention showing the application of initial condition tuning by tilting one of the reflective surfaces, and phasor sum tuning utilizing a pair of transducers for applying push-pull translation action to a pair of wave reflecting surfaces.

Figure 6:
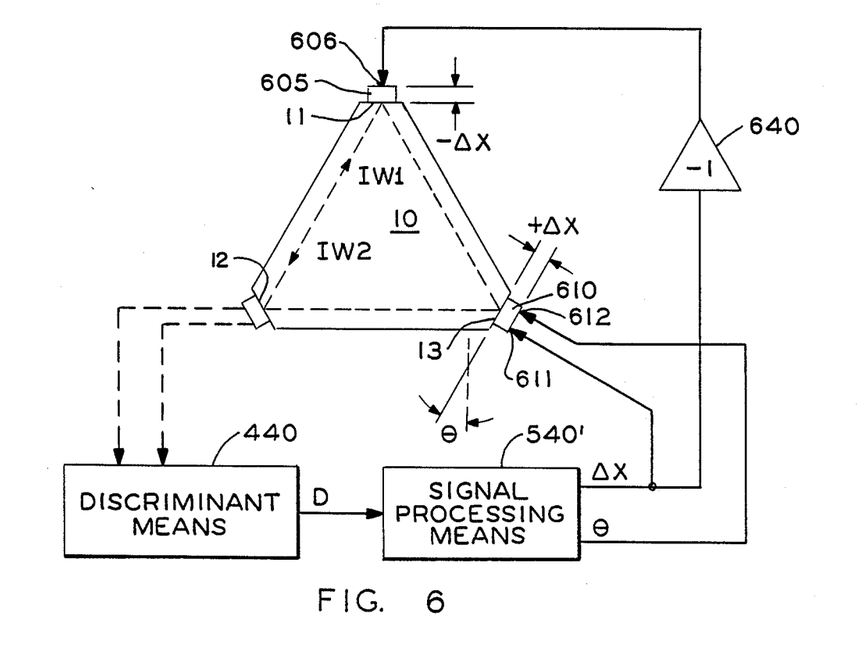
FIG. 6 is a block diagram of another embodiment of the invention.

Shown in FIG. 6 is a laser gyro 10 having a dual-mode transducing device 610, such as that shown in FIG. 2 or 3, capable of tilting the wave reflecting means 13 coupled thereto by an angle $\theta$, and capable of positionally translating the position of wave reflecting means 13 in a direction perpendicular to the surface thereof. Transducer 610, having a first input 611, is responsive to a control signal for directing the value of translation, $\Delta X$, of wave reflecting means 13. Further, transducer 610, having a second input 612, is responsive to another control signal capable of directing the magnitude of tilt of wave reflecting means 13. Also shown in FIG. 6 is a transducer 605, having wave reflecting means 11 coupled thereto, which is capable of translating the position of the wave reflecting means 11 in a direction perpendicular to the surface thereof. Transducer 605, having an input 606, is responsive to a control signal capable of directing the magnitude of translation of wave reflecting means 11.

The system of FIG. 6, like that shown in FIG. 5, utilizes discriminant means 440 responsive to waves IW1' and IW2' and provides an output signal indicative of lock-in rate which is presented to signal processing means 540'. Signal processing means 540' has a first output, indicated by $\Delta X$, which is presented to transducer input 611 of dual-mode transducing device 610 for controlling translation of wave reflecting means 13. The output $\Delta X$ is also presented to transducer input 606 of transducer 605 through a phase inverting amplifier 640, and is capable of controlling translation of wave reflecting means 11. The output of signal processing means 540' indicated by $\theta$, is presented to second input 612 of dual-mode transducing means 610 for tilting wave reflecting means 13 coupled thereto. Signal processing means 540' is substantially the same as signal processing means 540 except that the output designated $\phi$ in processor 540 is now designated $\Delta X$ in processor 540'. Signal processor 540' has the same details as processor 540 shown in FIG. 10.

The operation of FIG. 6 will now be described. The output of signal processing means 540' indicated by $\theta$ provides the same function as that shown in FIG. 5 and provided by the output of amplifier 1085 in FIG. 10. It provides initial condition tuning by altering the lasing path to obtain a minimum lock-in rate in response to a signal component related to reference signal 1082. The second output of signal processing means 540' indicated by $\Delta X$, provides essentially the same output as that indicated by $\phi$ in FIG. 5, and is provided by the output of amplifier 1075 in FIG. 10. However, the output signal $\Delta X$, directs translation of each wave reflecting means 11 and 13 in a direction so as to alter the total lasing path length, but in opposite sense due to phase inverter 640. When wave reflecting means 11 and 13 are operated in a push-pull manner as indicated in FIG. 6, the path length of the optical closed-loop path remains essentially constant. Nevertheless, the dithering and controlling of the average position of the lasing path by push-pull operation of transducers 610 and 605 provides phasor sum tuning similar to phasor sum tuning obtained in FIG. 5. Push-pull operation essentially rotates the optical closed-loop path about the vertex of the non-altered wave reflecting surface (12) without substantially changing path length. Nevertheless, the lasing path rotation as aforesaid alters the lasing path to change the coupling of energy between waves which is observed by changes in the discriminant means 440 output signal. In turn, a translational position of wave reflecting surfaces 11 and 13 is obtained which produces an optimum phasor sum tuning for a condition of optimum initial condition tuning to yield a minimum lock-in rate condition for the sensor.

A path length control or an intensity detecting means to maintain a constant intensity for bias stability may also be added to the system shown in FIG. 6. U.S. Pat. No. 4,152,071 teaches how to incorporate a path length control in combination with lock-in control with the push-pull operation of transducers 605 and 610 and therefore is not shown herein.

Figure 8:
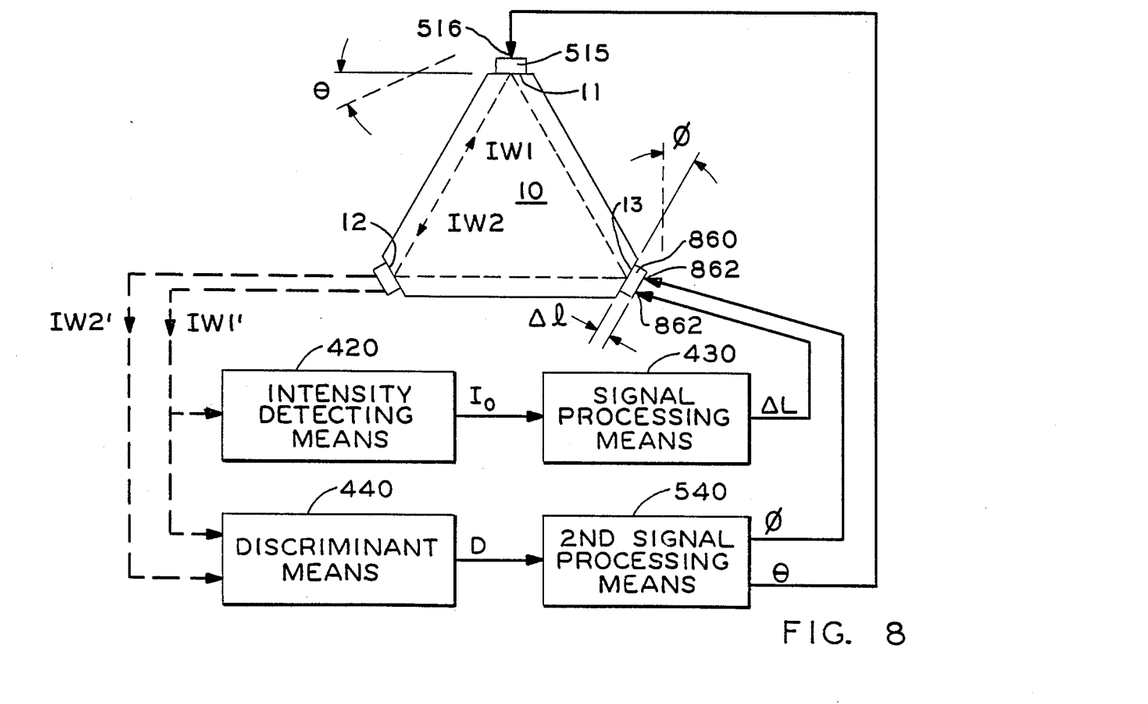
FIG. 8 is a block diagram of another embodiment of the invention.

Another embodiment of the invention is shown in FIG. 8 which is substantially that of FIG. 5 with the addition of the path length control or constant intensity control, shown in FIG. 4, for maintaining a constant intensity so as to obtain good bias stability of a laser gyro. Shown in FIG. 8 is again laser gyro 10, but wave reflecting means 13 is coupled to a dual-mode transducer 860 which replaces transducer 410 of FIG. 5. Transducer 860 is similar to that described in FIGS. 2 or 3 which is capable of translating the position of wave reflecting means 13 and also capable of tilting the position of wave reflecting means 13 in a manner as already described for altering the lasing path. Further shown in FIG. 8 is the closed-loop path length control shown in FIGS. 4 and 7 comprising the additional components of intensity detecting means 420 responsive to the wave IW1' for providing an output signal indicative of the intensity thereof, and signal processing means 430. The output of signal processing means 430 is presented to a first mode control 861 of transducer 860 for controlling translation of wave reflecting means 13 coupled thereto. The output of signal processing means 540 indicated by θ is connected to a second mode control 822 of transducer 860 for tilting the wave reflecting surface 13.

The operation of the system shown in FIG. 8 is similar to that described in FIGS. 4 and 5. Signal processing means 540 again provides (i) phasor sum tuning by tilting wave reflecting means 13 through operation of transducer 515 and (ii) initial condition tuning by altering the position of wave reflecting means 11 through operation of one mode of transducer 860 capable of tilting the wave reflecting means coupled thereto. The output of signal processing means 430 provides an output signal ΔL for directing the position of wave reflecting means 13 through operation of the second mode of transducer 860 for translating the position of wave reflecting means 13 so as to alter the effective path length of the closed-loop path. Signal processing means 430 includes a first reference signal for dithering the translation of position of wave reflecting means 13. Also, signal processing means 540 requires two distinguishable reference signals for dithering the tilting position of wave reflecting means 13 and 11. Therefore, the reference signals of signal processing means 430 and signal processing means 540 must all be distinguishable, for example, each having a different frequency, for obtaining the intended control of transducers 860 and 515 for obtaining phasor sum tuning, initial condition tuning, and intensity maximizing (path length control).

Figure 9:
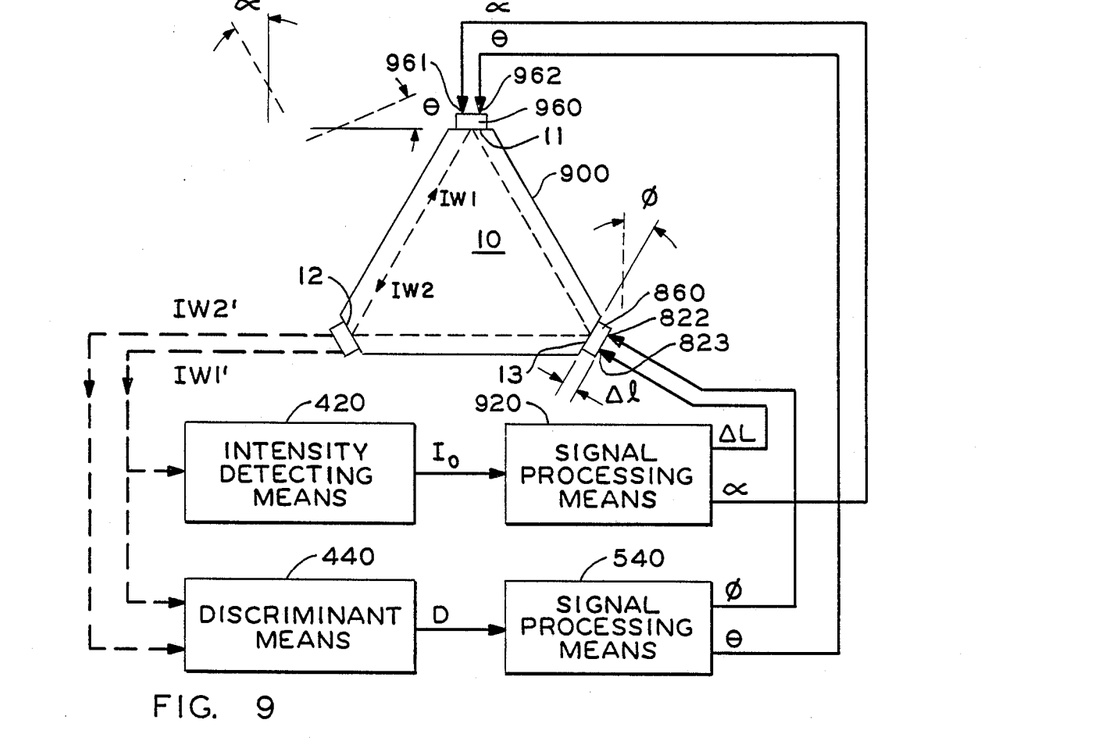
FIG. 9 is a block diagram of another embodiment of the invention.

FIG. 9 is another embodiment of the invention for operating laser gyro 10 utilizing the principles of the invention. FIG. 9 is a system which provides "initial condition" tuning, "phasor sum" tuning, "path length control", and "alignment control" utilizing only two lasing path transducers. In FIG. 9, wave reflecting means 13 is again shown coupled to transducer 860 similar to that shown in FIG. 8. Laser gyro 10 is shown having a wave reflecting means 11 coupled to a dual-mode transducing means 960 capable of tilting wave reflecting means 11 in two different directions. Transducing means 960 may be provided by the tilting means shown in FIG. 3 in which a first tilt direction is controlled by source 385 and a second tilt direction by source 390. Sources 385 and 390 are each provided with input control signals for control thereof. Transducing means 960 is shown having a first input 962 for controlling the angle of tilt, θ, about an axis substantially perpendicular to the plane of the waves as drawn in FIG. 9; and transducing means 960 is shown having a second input 961 for controlling the angle of tilt, α, about an axis through the plane of the wave reflecting surface 11 and substantially perpendicular to an axis perpendicular to the plane of the waves. The second direction of tilt α is capable of altering the lasing path relative to the laser cavity 900. The latter change in the lasing path is sometimes referred to as "alignment" with respect to the cavity which contains the laser beams. Alignment control is utilized to obtain maximum or constant intensity of the waves so as to maintain good bias stability in the sensor.

The laser cavity 900, well known in the art, is usually made of a mechanically, thermally stable block material. Tunnels (not shown) are bored through the block so as to provide unobstructed tunnels between wave reflecting surfaces positioned at ends of the tunnels. Alignment usually refers to, but is not limited to, the orientation of the optical closed-loop path of the waves IW1 and IW2 relative to walls of the tunnel so as to affect cavity losses which affect the intensity of waves.

The control system for the laser gyro system of FIG. 9 is similar to that shown in FIG. 8 with signal processing means 430 being replaced by signal processing means 920 having first and second outputs indicated by ΔL and α. Signal processing means 920 provides a first output signal ΔL presented to input 823 for translational mode control Δl of transducer 860 for controlling path length in the well known manner. The second output of signal processing means 920, presented to input 961 of transducer 960, is capable of directing a first mode of operation of transducer 960 for controlling the tilt of wave reflecting means 11 coupled thereto in the direction indicated by the angle for alignment control. A first output of signal processing means 540, indicated by θ, is connected to a second mode input 962 of transducer 860 for tilting the wave reflecting means 11 in the direction indicated by the angle θ. The second output of signal processing means 540, indicated by φ, is connected to a second input 822 of transducer 860 for tilting wave reflecting means 13 coupled thereto in a direction indicated by the angle φ.

Signal processing means 920 and 540 are further detailed in FIG. 10. Signal processing means 920 includes synchronous detector 910 having as a first pair of inputs the output of intensity detecting means 420 and one output of reference signal generator 950 indicated by reference signal 951. The output of synchronous detector 910 and reference signal 951 are presented to differential amplifier signal 925 having as an output signal ΔL. A second synchronous detector 930 has as a pair of inputs the output of intensity detecting means 420 and a second output of reference signal generator 950 indicated by reference signal 952 The output of synchronous detector 930 and reference signal 952 are presented as inputs to a differential amplifier 940 for providing an output signal indicated by $\alpha$. Also shown in FIG. 12 is signal processing means 540 as already described.

In operation, signal processing means 540 responds in an identical manner as that already described, and provides "phasor sum" tuning and "initial condition" tuning for obtaining a minimum lock-in condition of laser gyro 10. Signal processing means 920 provides a first feedback control system providing path length control for optimizing intensity of the waves by altering the path length of the optical closed-loop path by translation of the wave reflecting means 13 in response to control signal $\Delta L$. Further, signal processing means 920 provides a second servo control loop providing alignment control for optimizing the intensity of the waves by altering the alignment of the optical closed-loop path by tilting wave reflecting means 11 in response to control signal $\alpha$. Reference signal generator 950 provides first and second reference signals 951 and 952, being distinguishably different, for altering the intensity of the waves through path length and alignment independently of one another. Doing so, the intensity output signal of intensity detecting means 420 will have signal components related to reference signal generator outputs 951 and 952. Signal processing means 920 accordingly provides two independent feedback control systems for synchronously detecting the respective signal components of reference signals 951 and 952 for providing alignment and path length control.

FIG. 9 can be modified by replacing transducer 860 by a fixed wave reflecting means 13 and employing the tri-mode transducing device of FIG. 3 for transducer 960 coupled with wave reflecting means 12. Transducer 960 may then provide path length control by utilizing the translation operation of the transducer, and provide alignment and lock-in rate control by utilizing two degrees of freedom of tilt. However, with the modifications as just described only one lock-in rate control system is provided along with alignment and path length control with a single transducer. Note that in this situation only one of the outputs of signal processing means 540 is utilized.

In the foregoing embodiments of laser gyro systems, it has been shown that a minimum lock-in rate can be obtained by a first control loop for providing "phasor sum" tuning utilizing a transducer which is capable of rotating or tilting a single wave reflecting surface so as to alter the coupling of energy between the waves counter-propagating about a closed-loop path. Doing so, an optimum position can be obtained based on an initial condition of the apparatus. Further, it has been shown that a sound independent control loop can be provided to alter the initial conditions of the sensor system—initial condition tuning—and thereby minimize the lock-in rate obtained through the first control loop for phasor sum tuning about an optimum initial condition tuning. Each of these techniques can be applied in combination with path length control for obtaining maximum intensity or constant intensity as well as alignment control for also maximizing intensity or maintaining constant intensity with two degrees of freedom, namely, path length and alignment. Lastly, it has been shown that there are various methods of phasor sum tuning as well as initial condition tuning including tilting of a wave reflecting means which defines in part the closed-loop path, as well as altering the coupling of energy between the paths by translation. Thus there are many ways of applying the principles of the present invention and are intended to be within the scope of the present invention.

Although the embodiments described in the present application have shown a triangular closed-loop path, other configurations are, of course, possible and include among others a rectangular closed-loop path. The principles of the present application can be applied to such systems and are not limited to only triangular configurations and are intended to be within the scope of the present invention. Further, the embodiments of the invention are particularly shown using laser beams, but other forms of electromagnetic waves are, of course, possible.

The embodiments of the invention in which an exclusive property or right in claimed are defined as follows:

1. A tri-mode device for adjusting the position of a reflective surface having the capability of two degrees of freedom of tilt and one degree of freedom of translation comprising:
   a first substantially thermally and mechanically stable block for providing a reflective surface having,
     a first portion for mounting said block to a base structure;
     a resilient portion having a first surface and a second surface wherein said first surface includes said reflective surface capable of reflecting electromagnetic waves;
   a second substantially thermally and mechanically stable block for providing a mechanical link to said first block resilient portion having,
     a central portion being rigidly coupled to said resilient portion second surface, and
     at least first, second, and third sections located outwardly from said central portion; and
   at least first, second, and third mechanical transducing means coupled to said first, second, and third sections respectively, each of said mechanical transducing means being responsive to a control signal presented thereto and capable of independently providing a degree of movement of said second block and said central portion so as to deform said resilient portion and vary the position of said reflective surface relative to said base structure.

2. The apparatus of claim 1 further comprising a fourth mechanical transducing means coupled to a fourth section of said second block, said first, second, third, and fourth sections located outwardly from central portion, each of said first, second, third, and fourth mechanical transducing means being adapted to respond to a first control signal for translating said reflective surface along an axis through said reflective surface.

3. The apparatus of claim 2 wherein said first, second, third, and fourth sections are symmetrically located outwardly, at least in part, from said central portion, said first and third sections being diametrically opposite one another, and said second and fourth sections being diametrically opposite one another, said first and third sections being adapted to respond to a second control signal for providing a first degree of freedom of tilt of said reflective surface, and said second and fourth mechanical transducing means being adapted to respond to a third control signal for providing a second degree of freedom of tilt of said reflective surface.

4. The apparatus of claim 1, 2, or 3 wherein each of said mechanical transducing means is capable of independently expanding and contracting in response to said control signal presented thereto.

5. The apparatus of claim 4 wherein each of said mechanical transducing means has an upper portion coupled to said respective section of said first block and a lower portion coupled to said second block so that expansion and contraction of any one of said mechanical transducing means will cause movement of said transferring means so as to vary the position of said reflective surface relative to said base structure.

6. The apparatus of claim 4 wherein each of said transducing means upper portion is coupled to said respective section of said first block through a mechanical transferring means, and said lower portion is coupled to said second block through a mechanical transferring means.

7. The apparatus of claim 1 wherein said mechanical transducing means is provided, at least in part, by a piezoelectric material.

8. The apparatus of claim 6 wherein said mechanical transferring means is a resilient epoxy.

9. The apparatus of claim 1 wherein said first block consists of a quartz material, and said reflective surface is a polished selected portion of said first block.

10. The apparatus of claim 1 wherein said first block consists of a CerVit material, and said reflective surface is a polished selected portion of said first block.

11. The apparatus of claim 10 wherein said reflective surface is capable of reflecting electromagnetic waves in the form of laser beams.

12. In an angular rate sensor of the class wherein at least two waves propagate in opposite directions along a closed-loop path which includes at least a plurality of straight line segments and includes a plurality of wave reflecting surfaces defining said closed-loop path, each of said waves having an intensity associated therewith which includes intensity variations due to coupling of energy of each of said waves into the other along said closed-loop path, and wherein associated with said sensor is a lock-in rotation rate, related to said coupling of energy, below which said waves lock in to substantially the same frequency, wherein the improvement comprises:
  a tri-mode transducing means having one of said plurality wave reflecting surface coupled thereto, said tri-mode transducing means being responsive to a first signal for tilting the position of said wave reflecting means substantially about a first axis, said transducing means being further responsive to a second signal for tilting the position of said wave reflecting means associated therewith substantially about a second axis, and said transducing means being responsive to a third signal for translating said wave reflecting means along an axis through said wave reflecting surface;
  discriminant means capable of responding to said intensity variations of at least one of said waves for producing an output signal which is related to said lock-in rate of said sensor;
  intensity detecting means capable of responding to the intensity of at least one of said waves for producing an output signal which is related thereto;
  first signal processing means responsive to said discriminant means output signal for providing said first signal, said first signal capable of directing said tilt about said first axis to a condition of substantially a minimum lock-in rate;
  second signal processing means responsive to said intensity detecting means output signal for providing said second and third signals, said second signal being capable of directing the angle of tilt about said second axis of said wave reflecting means to a condition of substantially constant or maximum intensity of at least one of said waves, and said third signal being capable of directing said translation of said wave reflecting surface to a condition of substantially maximum or constant intensity.

13. An apparatus for obtaining minimum lock-in rate in an angular rate sensor of the class wherein at least two waves propagate in opposite directions along a closed-loop path which includes at least a plurality of straight line segments and includes a plurality of wave reflecting surface substantially defining said closed-loop path, each of said waves having an intensity associated therewith includes intensity variations due to coupling of energy of each of said waves into the other along said closed-loop path, and wherein associated with said sensor is a lock-in rotation rate, related to said coupling of energy, below which said waves lock-in to substantially the same frequency, the apparatus comprising:
  first transducing means, having a first one of said plurality of wave reflecting surfaces coupled thereto, for tilting said first reflective surface to alter the angle of incidence of said waves impinging thereon in response to a first signal;
  second transducing means, having a second one of said plurality of wave reflecting surfaces coupled thereto, for translating said reflective surface thereof in such a direction to alter the angle of incidence of said waves impinging thereon in response to a second signal;
  discriminant means responsive to said intensity variations of at least one of said waves for producing an output signal which is related to said lock-in rate of said sensor; and
  first and second independent negative feedback control means, responsive to said discriminant means output signal, for producing concurrently said first and second signals, respectively, to control the position of said first and second wave reflecting surfaces, coupled to said first and second transducing means, respectively, at a minimum lock-in rate condition.

14. An apparatus for obtaining minimum lock-in rate in an angular rate sensor of the class wherein at least two waves propagate in opposite directions along a closed-loop path which includes at least a plurality of straight line segments and includes a plurality of wave reflecting surfaces substantially defining said closed-loop path, each of said wave having an intensity associated therewith which includes intensity variations due to coupling of energy of each of said waves into the other along said closed-loop path, and wherein associated with said sensor is a lock-in rotation rate, related to said coupling of energy, below which said waves lock-in to substantially the same frequency, the apparatus comprising:
  a first dual-mode transducing means, having coupled thereto a first one of said plurality of wave reflecting surfaces, said dual-mode transducing means having a first mode responsive to a first signal for tilting the position of said wave reflecting surface associated therewith in such a direction so as to alter the angle of incidence said waves impinging thereon, said dual-mode transducing means being further responsive to a second signal for translating the position of said first wave reflecting surface associated therewith to alter the angle of incidence of said waves impinging thereon; and second transducing means having coupled thereto a second one of said plurality of wave reflecting surfaces, said second transducing means being responsive to said second signal for translating said second wave reflecting surface thereof in a direction to alter said angle of incidence of said waves impinging thereon and in opposite sense as said translation of said first wave reflecting surface;

discriminant means responsive to said intensity variations of at least one of said waves for producing an output signal which is related to said lock-in rate of said sensor; and first and second independent negative feedback control means, responsive to said discriminant means output signal, for producing concurrently said first and second signals, respectively, to control the position of said first and second wave reflecting means coupled to said first dual-mode transducing means and said second transducing means, respectively, at a minimum lock-in condition.

15. In an angular rate sensor of the class wherein at least two waves propagate in opposite directions along a closed-loop path which includes at least a plurality of straight line segments and includes a plurality of wave reflecting surfaces defining said closed-loop path, each of said waves having an intensity associated therewith which includes intensity variations due to coupling of energy of each of said waves into the other along said closed-loop path, and wherein associated with said sensor is a lock-in rotation rate, related to said coupling of energy, below which said waves lock into substantially the same frequency, wherein the improvement comprises:

cavity means for providing said closed-loop path, said cavity including a plurality of straight line segment tunnels through which said waves travel; and dual-mode transducing means having coupled thereto a first one of said plurality of wave reflecting surfaces, said dual-mode transducing means having a first mode for tilting said reflective surface coupled thereto in response to a first signal, said dual-mode transducing means having a second mode for tilting the position of said wave reflecting beams associated therewith in response to a second signal;

discriminant means for responding to said intensity variations of at least one said waves and producing an output signal which is related to said lock-in rate of said sensor;

first signal processing means responsive to said discriminant means output signal for providing said first signal to direct said first mode of said dual-mode transducing means so that said angle of incidence said wave impinging on said at least a first one of said plurality of wave reflecting surfaces is such that said lock-in rate is substantially a minimum; and second signal processing means responsive to the intensity of at least one of said waves for producing said second signal to direct said second mode of said dual-mode transducing means so as to align said closed-loop path relative to said tunnels for maintaining the intensity of said waves substantially constant or for maximizing said intensity of said at least one of said waves.

* * * * *